US012245982B1

(12) United States Patent
Zhao et al.

(10) Patent No.: US 12,245,982 B1
(45) Date of Patent: Mar. 11, 2025

(54) LENGTH-ADJUSTABLE MEANDERING MASSEUR

(71) Applicants: Dongguan Yishuo Electronic Technology Co., Ltd., Guangdong (CN); Shenzhen Linglang Trading Co., Ltd., Shenzhen (CN)

(72) Inventors: Quan Zhao, Guangdong (CN); Hongdu Suo, Guizhou (CN)

(73) Assignees: Dongguan Yishuo Electronic Technology Co., Ltd., Dongguan (CN); Shenzhen Linglang Trading Co., Ltd., Shenzhen (CN)

( * ) Notice: Subject to any disclaimer, the term of this patent is extended or adjusted under 35 U.S.C. 154(b) by 0 days.

(21) Appl. No.: 18/665,811

(22) Filed: May 16, 2024

(30) Foreign Application Priority Data

Mar. 15, 2024 (CN) ........................ 202410297293.8

(51) Int. Cl.
*A61H 23/02* (2006.01)

(52) U.S. Cl.
CPC . *A61H 23/0254* (2013.01); *A61H 2201/1481* (2013.01); *A61H 2201/1669* (2013.01); *A61H 2205/081* (2013.01)

(58) Field of Classification Search
CPC .... A61H 2201/1481; A61H 2201/1669; A61H 2205/081; A61H 15/00; A61H 23/0254; A61H 19/00; A61H 19/30; A61H 19/32; A61H 19/34; A61H 19/50; A61H 19/40; A61H 19/44; A61H 7/002; A61H 7/005; A61H 7/006; A61H 7/007; A61H 15/0078; A61H 15/0085
See application file for complete search history.

(56) References Cited

U.S. PATENT DOCUMENTS 1,710,051 A * 4/1929 Giacopazzi ........ A61H 15/0085 601/123
1,827,874 A * 10/1931 Hemp ................ A61H 15/0092 601/132
2003/0014079 A1* 1/2003 Tucek .................... A61H 1/008 601/111
(Continued)

FOREIGN PATENT DOCUMENTS

WO WO-2016033640 A1 * 3/2016 ............. A61H 19/44
WO WO-2020098932 A1 * 5/2020 ......... A61H 15/0078

*Primary Examiner* — Timothy A Stanis
*Assistant Examiner* — Tyler A Raubenstraw

(57) ABSTRACT

A length-adjustable meandering masseur comprises motor lower cover, outer wall sliding connection part of motor lower cover-motor upper cover, outer wall rotating connection part of motor lower cover-head ornament, outer wall fixed connection part of head ornament-buckle position, outer wall rotating connection part of buckle position-swinging part, and inner wall setting part of motor lower cover-drive component. The drive component comprises a gear motor, its outer wall is fixedly connected with the inner wall of motor lower cover, its output end is fixedly connected with a rotary rod, and its outer wall is fixedly connected with the inner wall of motor upper cover. Through the cooperation between motor lower cover, gear motor, motor upper cover, head ornament, and swinging part, it is easier for users to customize the masseur length, so as to better massage the body fully, and provide more comfort and personalized massage experience.

10 Claims, 2 Drawing Sheets

(56) References Cited

U.S. PATENT DOCUMENTS

| | | | | |
|---|---|---|---|---|
| 2003/0093016 A1* | 5/2003 | Chen | A61H 19/44 | 601/127 |
| 2005/0015028 A1* | 1/2005 | Luettgen | A61H 19/50 | 601/72 |
| 2007/0142754 A1* | 6/2007 | Nan | A61H 19/44 | 601/72 |
| 2007/0149903 A1* | 6/2007 | Nan | A61H 19/44 | 601/72 |
| 2008/0091127 A1* | 4/2008 | Nan | A61H 15/00 | 601/60 |
| 2009/0198158 A1* | 8/2009 | Nan | A61H 23/0254 | 601/87 |
| 2010/0125228 A1* | 5/2010 | Yao | A61H 23/0254 | 601/111 |
| 2013/0237751 A1* | 9/2013 | Alexander | H02K 33/16 | 600/38 |
| 2015/0005682 A1* | 1/2015 | Danby | A61H 23/0254 | 601/101 |
| 2015/0374576 A1* | 12/2015 | Dagan | A61H 7/003 | 601/119 |
| 2016/0199043 A1* | 7/2016 | Koretsky | A61B 10/0058 | 604/349 |
| 2016/0296414 A1* | 10/2016 | Cox | A61H 15/0092 | |
| 2016/0354277 A1* | 12/2016 | Fima | A61H 19/44 | |
| 2017/0319427 A1* | 11/2017 | Udhardt | A61H 23/0254 | |
| 2018/0311105 A1* | 11/2018 | Lonergan | A63H 3/04 | |
| 2019/0254922 A1* | 8/2019 | Marton | A61H 23/006 | |
| 2020/0246213 A1* | 8/2020 | McHutchison | A61H 15/0092 | |
| 2021/0022949 A1* | 1/2021 | Janapol | A61H 23/0263 | |
| 2022/0096319 A1* | 3/2022 | Yi | A61H 23/0263 | |
| 2022/0104997 A1* | 4/2022 | Lawrie | B25G 3/34 | |
| 2022/0125672 A1* | 4/2022 | Wersland | A61H 23/0254 | |
| 2022/0211572 A1* | 7/2022 | Cao | A61H 23/0254 | |

* cited by examiner

LENGTH-ADJUSTABLE MEANDERING MASSEUR

FIELD OF THE INVENTION

The invention involves in the technical field of masseurs, in particular to a length-adjustable meandering masseur.

BACKGROUND OF THE INVENTION

Masseur is a new generation of health care equipment developed according to bionics, physics, bioelectricity, traditional Chinese medicine and many years of clinical practice. Masseurs can be divided into energy-consuming and non-energy-consuming masseur, active masseur and passive masseur, etc.

An adjustable masseur is disclosed in the announcement number: CN215536377U after searching, comprising a back plate, an elastic belt, a massage cavity and a rubber pad, wherein the elastic belt is arranged on the walls of both sides of the back plate, the massage cavity is arranged in the back plate, the rubber pad is arranged on one side of the massage cavity, a sound absorbing board is arranged on the inner wall of the massage cavity, a sound absorbing cavity is arranged on the sound absorbing board, a guide rail is arranged on one side wall of the sound absorbing board, a slider is arranged in the guide rail, and an electric push rod is arranged on one side wall of the slider; The utility model has the advantages that the back plate and the elastic belt are arranged, the back plate transforms the original hand-held type into the back strap type, and the user can carry the device on the back through the elastic belt, which not only does not affect the normal work of the user, but also makes the device massage the user anytime and anywhere, ensures the use performance of the device, improves the practicability of the device and the user experience. In the application, the masseur is limited by the length of the handle, it is not convenient to store and use in a long time, and the body back part is difficult to touch and massage in a short time, which affects the normal use of the masseur.

DESCRIPTION OF THE INVENTION

Aiming at the deficiency of the prior art, the invention provides a length-adjustable meandering masseur, which solves the problems that the masseur is limited by the length of the handle, is not convenient for storage and use when it is long, and is difficult to touch and massage the back part of the body when it is short, thus affecting the normal use of the masseur.

In order to realize the above purpose, the invention is realized by the following technical proposal: the length-adjustable meandering masseur comprises a motor lower cover, the outer wall of the motor lower cover is slidably connected with a motor upper cover, the outer wall of the motor lower cover is rotatably connected with a head ornament, the outer wall of the head ornament is fixedly connected with a buckle position, the outer wall of the buckle position is rotatably connected with a swinging part, and the inner wall of the motor lower cover is provided with a driving component.

Preferably, the drive assembly comprises a gear motor, the outer wall of the gear motor is fixedly connected to the inner wall of the motor lower cover, and the output end of the gear motor is fixedly connected with a rotary rod.

Preferably, the outer wall of the gear motor is fixedly connected to the interior of the motor upper cover, and the motor upper cover and the motor lower cover play a protective role for the gear motor.

Preferably, the outer wall of the rotary rod is disposed in the middle of the head ornament and the plurality of rocking members.

Preferably, the outer wall of the upper cover of the motor is fixedly connected with a vibrating motor, and the vibrating part and the rotating rod are vibrated up and down by the vibrating motor to realize the massage function.

Preferably, the swinging part has an adjustable angle, and the angle of the swinging part can be adjusted as needed to achieve more precise massage of the target area.

Preferably, the motor upper cover and the motor lower cover can prevent the user's hand from touching the rotating member, ensuring safety in use.

Preferably, a sealing ring is arranged between the motor lower cover and the motor upper cover, and the sealing ring can prevent external substances such as water or dust from entering the inside of the masseur, and protect the normal operation of the internal mechanical components.

Preferably, the outer walls of the motor lower cover and the motor upper cover are fixedly connected with anti-slip strips, and the anti-slip strips can increase the stability of the masseur during use.

Preferably, the material of the rotary rod is rubber to prevent skin damage during massage.

Working principle: When the masseur needs to be used, the deceleration motor starts to work and drives the rotary rod to rotate motion. This rotational motion not only provides power for the masseur, but also brings a unique massage effect. The deceleration motor is connected with the rotary rod to form a direction track of the rotary circle. This design enables the masseur to maintain a stable movement trajectory when rotating, thus providing users with a more comfortable and effective massage experience. In order to ensure the stable operation of the masseur, the deceleration motor is firmly fixed through the motor lower cover and the motor upper cover, so that it can maintain stable performance even when rotating at high speed. On the head of the masseur, there is a well-designed head ornament. This ornament not only has a beautiful appearance, but more importantly, it can convert the rotary movement into a softer and more comfortable massage force. In addition, the masseur is equipped with remote ornaments. The remote ornament is connected with the buckle position of the head ornament, and the rotation of the rotary porch is used to drive the remote ornament to realize the swimming movement. This swimming movement not only increases the interest of the masseur, but also provides users with a more comprehensive and in-depth massage experience. In order to achieve a richer massage effect, the masseur also combines a vibration motor and a gearmotor. When the masseur is working, the vibration motor will produce a vibration effect, combined with the rotating movement of the gearmotor, to realize the up and down meandering movement of the swinging part and the rotating rod. At the same time, the vibration massage effect is added. This comprehensive massage method can not only penetrate into the muscle tissue, relieve fatigue and tension, but also promote blood circulation and help users rejuvenate and rejuvenate.

The invention provides a length-adjustable meandering masseur. It has the following beneficial effects:

1. Through the cooperation between the motor lower cover, the gear motor, the motor upper cover, the head ornaments and the swinging parts, the invention enables the user to more easily define the length of the masseur, so as to better massage different parts of the body, provides a more comfortable and personalized massage experience, solves the problem that the masseur is limited by the length of the handle, is not convenient for storage and use for a long time, and is difficult to touch the back part of the body for massage in a short time, which affects the normal use of the masseur, and improves the functionality of the masseur.

2. Through the cooperation between the deceleration motor, the motor upper cover, the head ornament, the swinging part, the rotating rod and the vibration motor, the swinging part and the rotating rod meander up and down and simultaneously add the vibration massage function, thus improving the massage effect of the masseur in use.

BRIEF INTRODUCTION OF THE DRAWINGS

Wherein, 1. a motor lower cover; 2. Gear motor; 3. Motor upper cover; 4. Head ornaments; 5. Swinging parts; 6. Rotating lever; 7. Vibrating motor.

DETAILED DESCRIPTION OF THE PREFERRED EMBODIMENTS

The following will be a clear and complete description of the technical proposal in the embodiment of the present invention in conjunction with the drawings of the specification of the present invention. Obviously, the embodiments described are only some embodiments of the present invention, but not all embodiments. Based on the embodiments of the present invention, all other embodiments obtained without creative effort by those of ordinary skill in the art fall within the scope of protection of the present invention.

Embodiments

Figure 1:
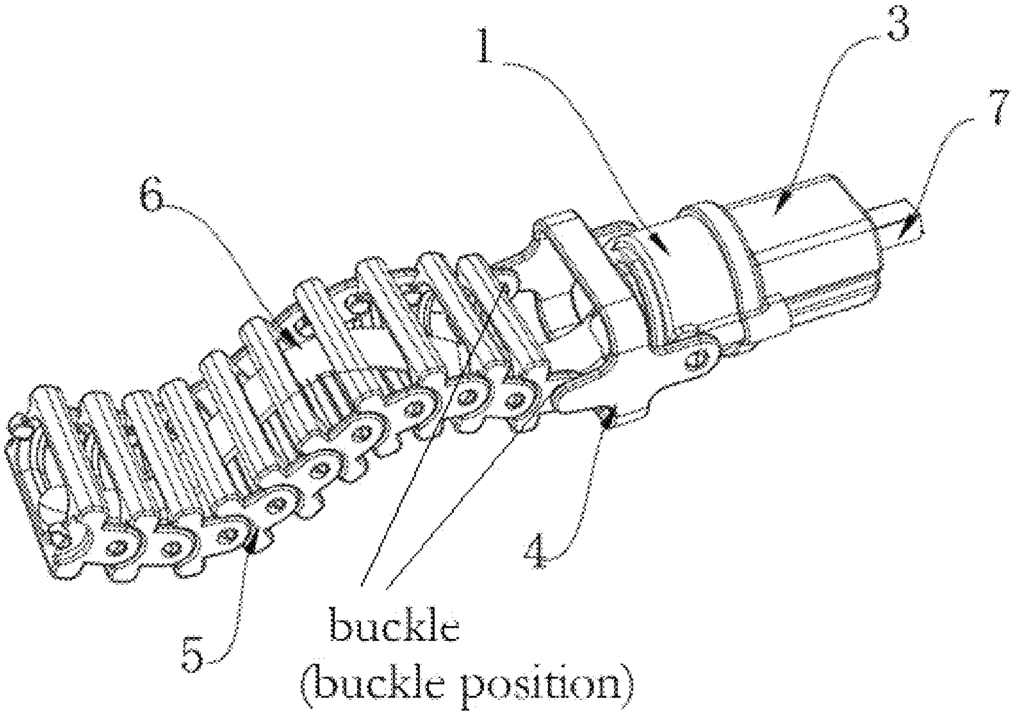
FIG. 1 is a perspective view of the present invention.
Figure 2:
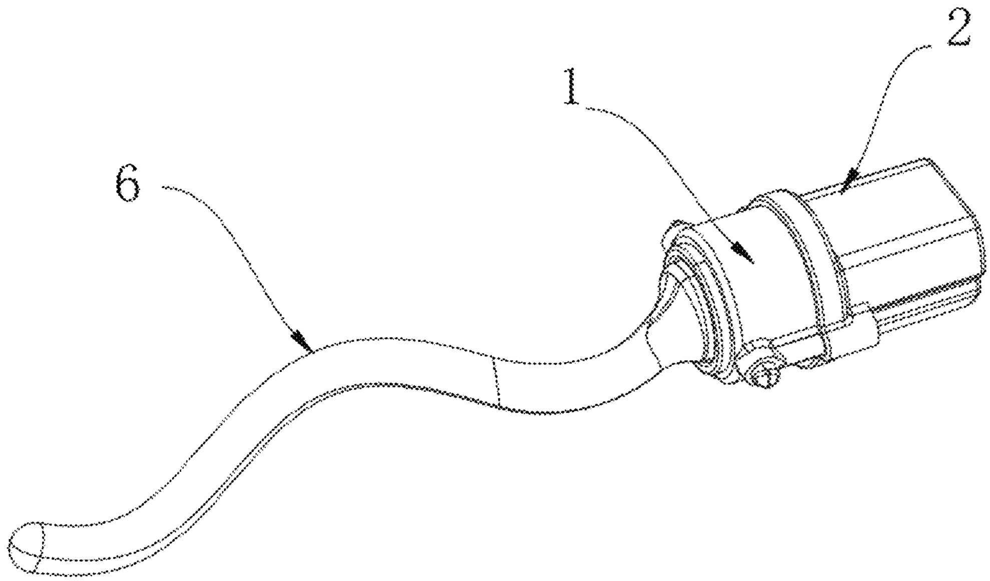
FIG. 2 is a schematic diagram of a portion of the rotary lever according to the present invention.

Referring to FIGS. 1-2, an embodiment of the present invention provides a length-adjustable meandering masseur, comprising a motor lower cover 1, an outer wall of the motor lower cover 1 is slidably connected with a motor upper cover 3, an outer wall of the motor lower cover 1 is rotatably connected with a head ornament 4, an outer wall of the head ornament 4 is fixedly connected with a buckle position, an outer wall of the buckle position is rotatably connected with a swing member 5, and an inner wall of the motor lower cover 1 is provided with a drive assembly.

Specifically, the motor lower cover 1 provides support and stability for the bottom part of the masseur, its outer wall is slidably connected with the motor upper cover 3 to ensure the overall structure of the masseur is stable, the motor upper cover 3 is located above the motor lower cover 1 and is slidably connected with it, the motor upper cover 3 plays a role in protecting the driving component to ensure its normal operation and increase the durability of the masseur, the head ornament 4 is located on the outer wall of the motor lower cover 1 and is rotatably connected with it, the head ornament 4 is exquisitely designed to convert the rotational movement into a soft and comfortable massage force and provides a more detailed massage experience, the buckle position is located on the outer wall of the head ornament 4 and is fixedly connected with it, the existence of the buckle position enables the head ornament 4 to be stably fixed on the motor upper cover 3 and is rotatably connected with it, the swinging part 5 is located on the outer wall of the buckle position to ensure the normal operation of the masseur, the swinging part 5 is located on the outer wall of the buckle position and is rotatably connected with it, the swinging part 5 is rotatably connected with the motor lower cover 1 to realize the up and down swinging movement through the rotation connection with the movement of the rotational drive rotary rod 6 drives the operation of the entire masseur.

Figure 3:
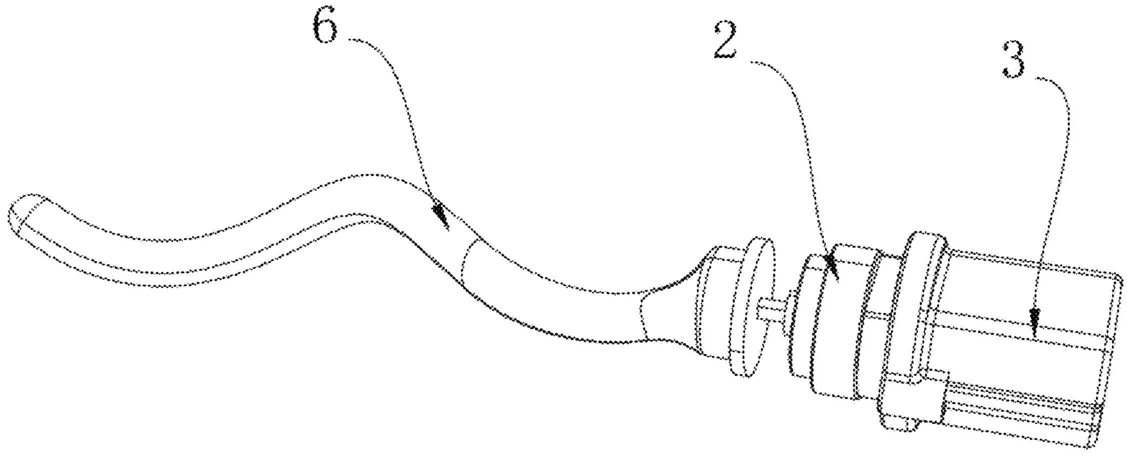
FIG. 3 is a schematic diagram of a part of the structure of a gear motor according to the present invention.
Figure 4:
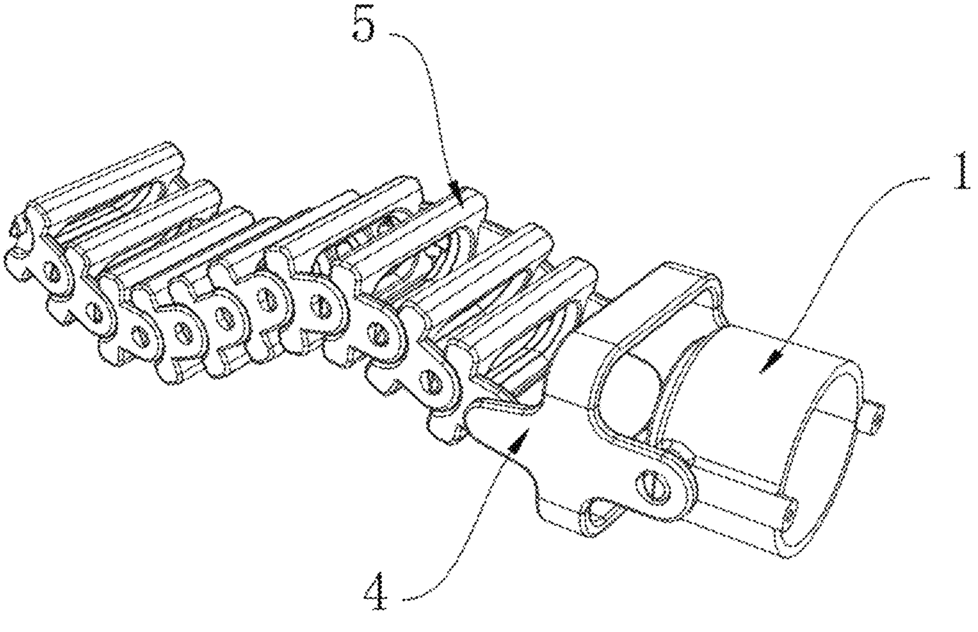
FIG. 4 is a schematic diagram of a portion of the head ornament according to the present invention.

Referring to FIGS. 2-4, the driving assembly includes a gear motor 2, the outer wall of the gear motor 2 is fixedly connected to the inner wall of the motor lower cover 1, the output end of the gear motor 2 is fixedly connected to the rotating rod 6, the outer wall of the gear motor 2 is fixedly connected to the inner of the motor upper cover 3, the motor upper cover 3 and the motor lower cover 1 play a protective role for the gear motor 2, the outer wall of the gear motor 6 is arranged in the middle of the head ornament 4 and a plurality of rocking members 5, the outer wall of the motor upper cover 3 is fixedly connected to a vibration motor 7, and the rocking members 5 and the rotating rod 6 are vibrated up and down to realize the massage effect.

Specifically, when the masseur is used, the gearmotor 2 starts to work and drives the rotary rod 6 to perform a rotary motion, which not only provides power to the masseur, but also brings a unique massage effect to the masseur. The gear motor 2 is connected to the rotary rod 6 to form a directional track of the rotary circle, so that the masseur can maintain a stable movement track when rotating, and provides a more comfortable and effective massage experience for the user.

Referring to FIG. 1, the swinging part 5 has an adjustable angle, and the angle of the swinging part 5 can be adjusted according to the needs to achieve more precise massage of the target area. The motor upper cover 3 and the motor lower cover 1 can prevent the user's hand from touching the swinging part to ensure the safety of use. The sealing ring is arranged between the motor lower cover 1 and the motor upper cover 3. The sealing ring can prevent external substances such as water or dust from entering the inside of the masseur and protect the normal operation of the internal mechanical components. The outer wall of the motor lower cover 1 and the motor upper cover 3 is fixedly connected with an anti-slip strip. The anti-slip strip can increase the stability of the masseur during use. The material of the rotating rod 6 is rubber to prevent skin damage during massage, and plays a role of fixation and support through the base.

Specifically, the motor upper cover 3 and the motor lower cover 1 are arranged so as to prevent the hand from touching the rotating parts, and ensure the safety of use, so that the masseur will not be accidentally injured. The sealing ring is arranged between the motor lower cover 1 and the motor upper cover 3. The function of the sealing ring is to prevent external substances such as water or dust from entering the interior of the masseur and protect the normal operation of the internal mechanical parts, which helps to improve the durability and reliability of the masseur. The outer wall of the motor lower cover 1 and the motor upper cover 3 is fixedly connected with an anti-slip strip. The existence of the anti-slip strip can increase the stability of the masseur during use, prevent sliding and accidental falling, and provide a safer and more comfortable use experience. The rotating rod 6 is made of rubber material, which has softness and elasticity, can reduce friction and irritation to the skin, and avoid damage to the skin during massage.

While embodiments of the present invention have been shown and described, it will be appreciated to those of ordinary skill in the art that a variety of variations, modifications, substitutions and variations may be made to these embodiments without departing from the principles and spirit of the present invention, the scope of which is defined by the appended claims and their equivalents.

What is claimed is:

1. A length-adjustable meandering masseur comprising a motor lower cover (1), characterized in that a outer wall of the motor lower cover (1) is slidably connected with a motor upper cover (3), the outer wall of the motor lower cover (1) is rotatably connected with a head ornament (4), a outer wall of the head ornament (4) is fixedly connected with a buckle, an outer wall of the buckle is rotatably connected with a swing member (5), and an inner wall of the motor lower cover (1) is provided with a drive assembly.

2. The length-adjustable meandering masseur according to claim 1, wherein the drive assembly comprises a gear motor (2), an outer wall of the gear motor (2) being fixedly connected to an inner wall of the motor lower cover (1), and an output end of the gear motor (2) being fixedly connected to a rotary rod (6).

3. The length-adjustable meandering masseur according to claim 2, wherein the outer wall of the gear motor (2) is fixedly connected to an interior of a motor upper cover (3), and the motor upper cover (3) and the motor lower cover (1) protect the gear motor (2).

4. The length-adjustable meandering masseur according to claim 2, wherein an outer wall of the rotary rod (6) is disposed between a head ornament (4) and a plurality of swinging parts (5).

5. The length-adjustable meandering masseur according to claim 2, wherein the rotary rod (6) is made of rubber to prevent skin damage during massage.

6. The length-adjustable meandering masseur according to claim 1, wherein the outer wall of the motor upper cover (3) is fixedly connected with a vibrating motor (7), and the vibrating motor (7) vibrates the plurality of swinging parts (5) and the rotary rod (6) up and down to realize the massaging effect.

7. The length-adjustable meandering masseur according to claim 1, wherein the plurality of swinging parts (5) has an adjustable angle, and the angle of the swinging part (5) can be adjusted as needed to achieve a more precise massage target area.

8. The length-adjustable meandering masseur according to claim 1, wherein the motor upper cover (3) and the motor lower cover (1) can prevent a user's hand from touching a rotating member and ensure safety in use.

9. The length-adjustable meandering masseur according to claim 1, wherein a sealing ring is arranged between the motor lower cover (1) and the motor upper cover (3), and the sealing ring can prevent external substances such as water or dust from entering the inside of the masseur and protect the normal operation of internal mechanical components.

10. The length-adjustable meandering masseur according to claim 1, wherein the outer walls of the motor lower cover (1) and the motor upper cover (3) are fixedly connected with an anti-slip strip, and the anti-slip strip can increase the stability of the masseur during use.

* * * * *